J. R. SNYDER.
TRIPLE VALVE.
APPLICATION FILED MAR. 21, 1912.

1,097,056.

Patented May 19, 1914.
3 SHEETS—SHEET 1.

WITNESSES

INVENTOR
Jacob Rush Snyder
By Fred'k W Winter
Attorney

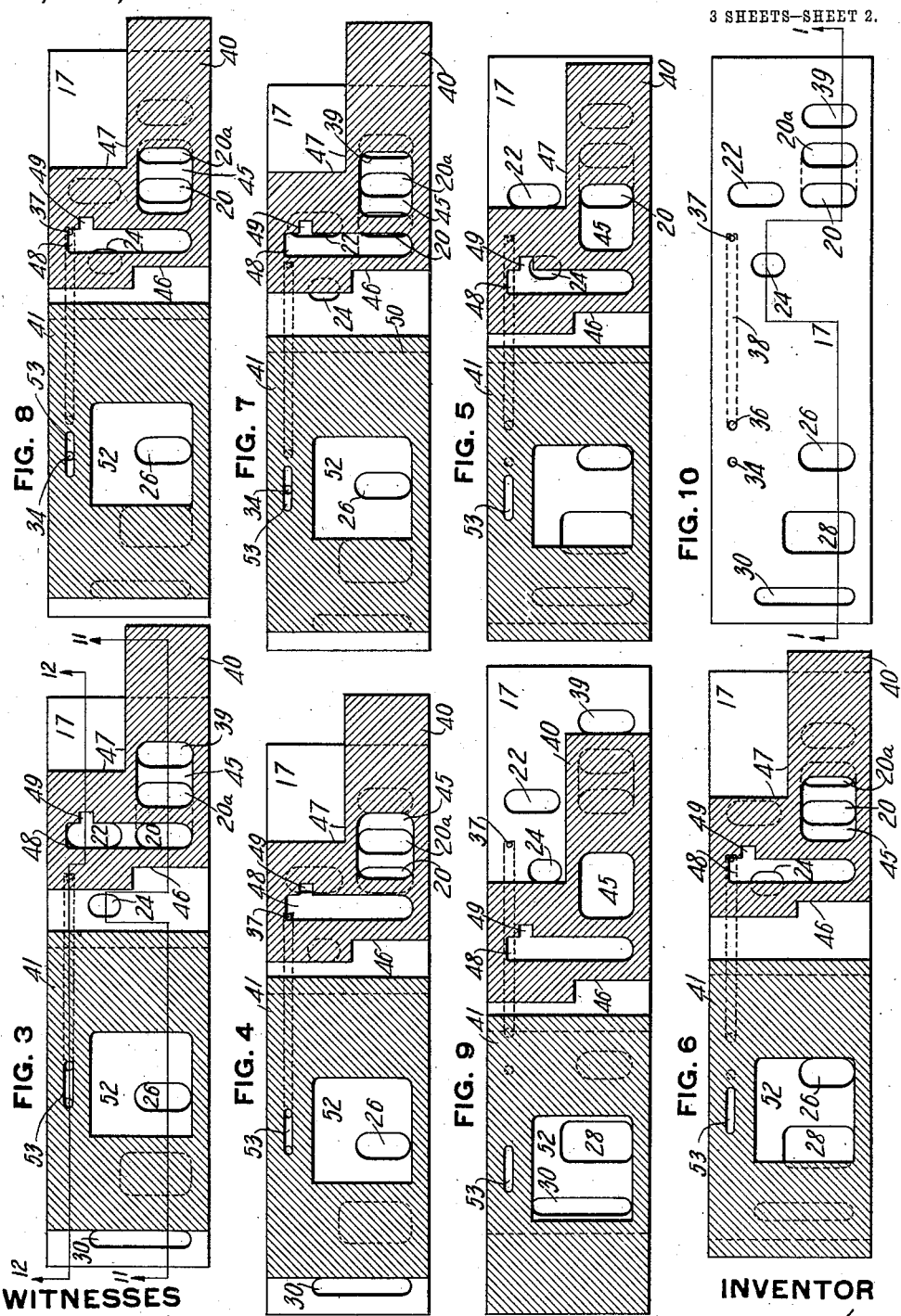

J. R. SNYDER.
TRIPLE VALVE.
APPLICATION FILED MAR. 21, 1912.

1,097,056.

Patented May 19, 1914.
3 SHEETS—SHEET 3.

WITNESSES

INVENTOR
Jacob Rush Snyder

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

TRIPLE VALVE.

1,097,056.

Specification of Letters Patent.

Patented May 19, 1914.

Application filed March 21, 1912. Serial No. 685,235.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems.

The object of the invention is to provide a triple valve having the usual functions of triple valves, and also providing for a quick serial action of the brakes throughout the train and for a graduated release of the brakes, and also for the emergency application by means of the usual brake cylinder and a second or emergency brake cylinder, and which performs these various functions by much simpler and less complicated constructions than prior valves for effecting the same results and functions.

The invention comprises the construction and arrangement of parts of a triple valve hereinafter described and claimed.

Figure 1:
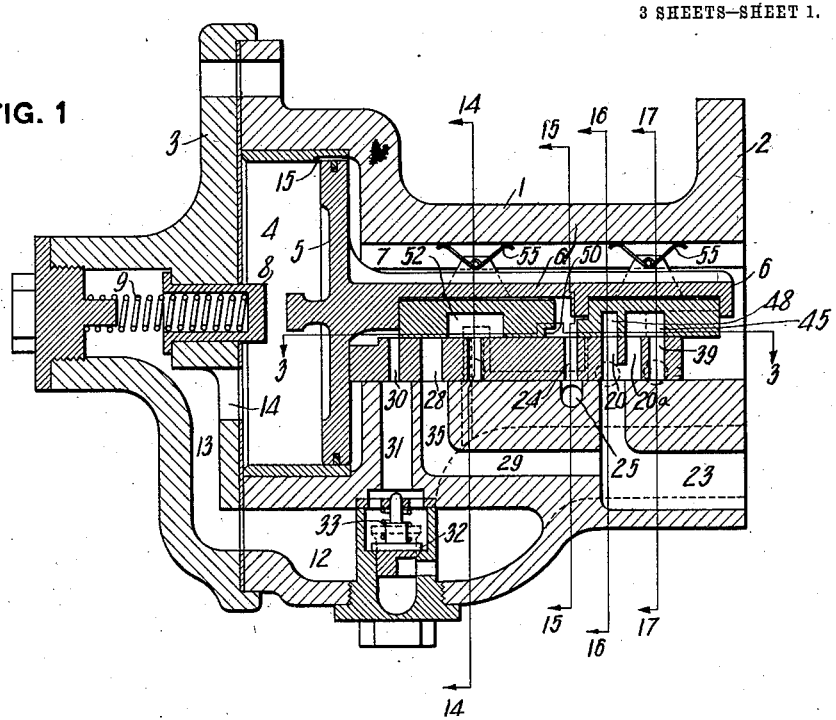
Figure 2:
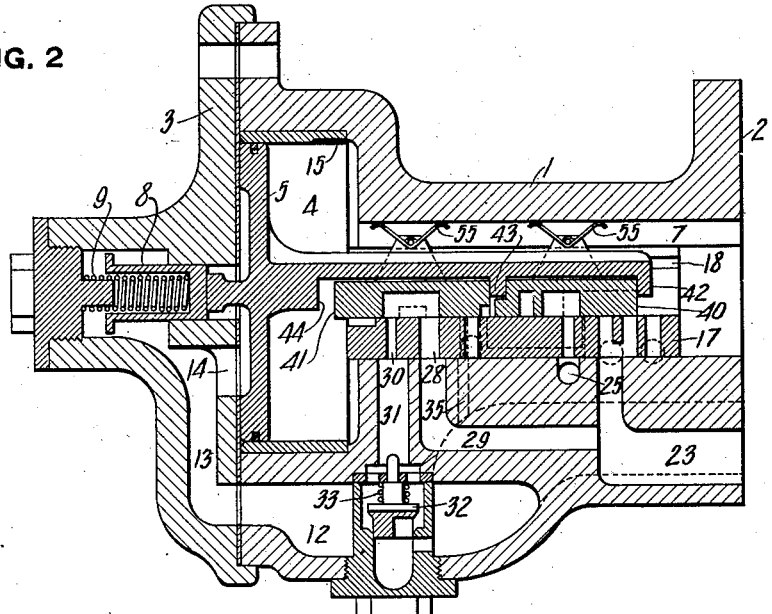
Figure 13:
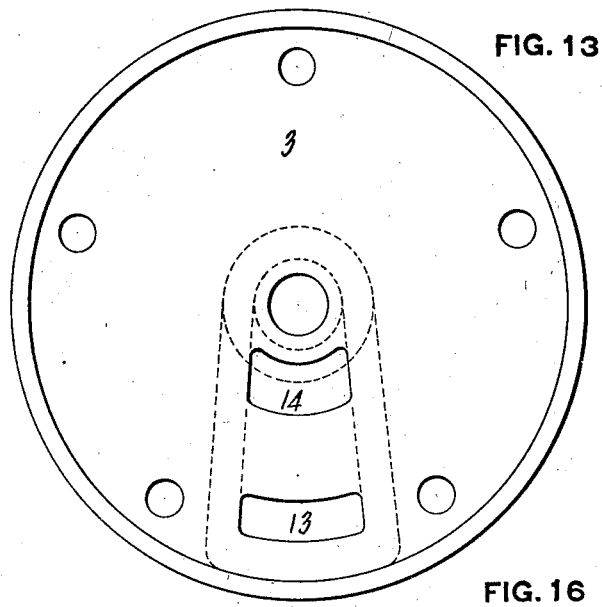
Figure 14:
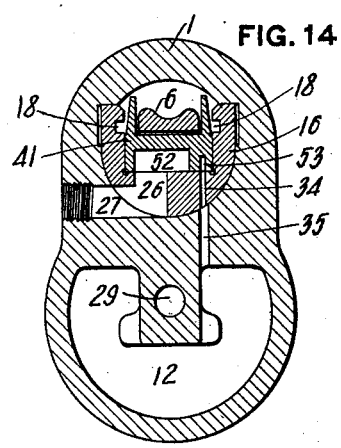
Figure 15:
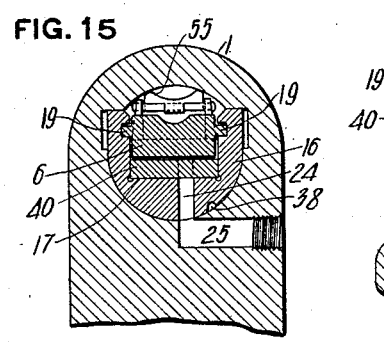
Figure 16:
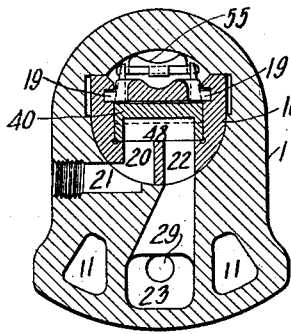
Figure 17:
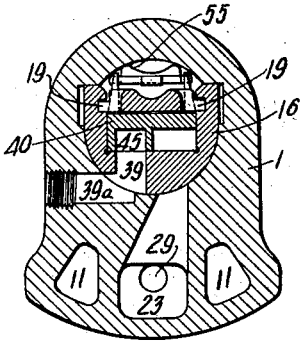
Figure 11:
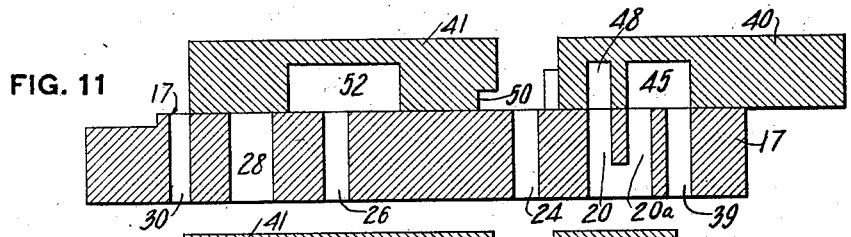
Figure 12:
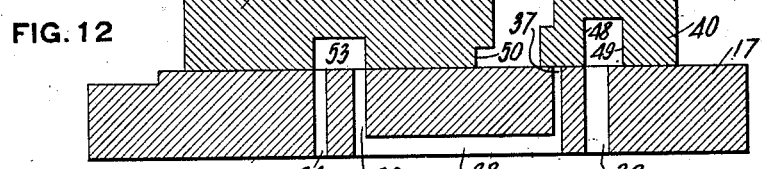

In the accompanying drawings Figures 1 and 2 are longitudinal sections through a triple valve embodying the invention, taken on the line 1—1, Fig. 10, Fig. 1 showing the same in full release and re-charging position, and Fig. 2 showing the same in emergency application position; Figs. 3, 4, 5, 6, 7, 8 and 9 are sectional plan views showing the valve seat and slide valves in horizontal section on the line 3—3, Fig. 1, and showing different positions of the valve, Fig. 3 showing the same in full release position, Fig. 4 in quick service or quick serial application position, Fig. 5 in full service position, Fig. 6 in service lap position, Fig. 7 in graduated release position, Fig. 8 in graduated release lap position, and Fig. 9 in emergency position; Fig. 10 is a plan view of the valve seat; Fig. 11 is a vertical longitudinal section through the valve seat and valves in full release position on the line 11—11, Fig. 3; Fig. 12 is a similar view on the line 12—12, Fig. 3; Fig. 13 is an inside view of the head or cap of the valve casing; Fig. 14 is a vertical transverse view on the line 14—14, Fig. 1; Fig. 15 is a similar view on the line 15—15, Fig. 1; Fig. 16 is a similar view on the line 16—16, Fig. 1; and Fig. 17 is a similar view on the line 17—17, Fig. 1.

The valve in its general form, construction and arrangement follows the standard type of Westinghouse and similar valves. It comprises a casing 1 provided at one end with a flat face 2 for connection to the auxiliary reservoir and brake cylinder, and closed at its other end by means of the head or cap 3. In said casing is the usual chamber 4 in which works the piston 5 which is provided with a stem 6 extending into the bore 7 of the casing and actuating the slide valves. In the head or cap 3 is the usual graduating stem 8 held by graduating spring 9 and against which the main piston abuts, as is usual in triple valves. The train or brake pipe connection is through two passages 11 extending longitudinally in the casing and meeting in a passage 12 from which a passage 13 leads through the cap or head 3 and communicates with the piston chamber 4 through port 14. In the bushing of piston chamber 4 is the usual charging groove 15 which is open when the valve is in full release position, and through which train pipe air passes the piston and thence through the bore 7 to the auxiliary reservoir which is connected directly with the end of bore 7. In the bore 7 is a suitable bushing 16 of general U-shape, as shown in Figs. 14, 15, 16 and 17 and having its lower portion 17 forming a valve seat. The inner sides of the bushing are provided with longitudinal grooves 18 for receiving wings or ribs 19 on the piston stem 6, so as to provide a guide for the piston 5 and its stem.

The seat 17 is provided with the ports and passages shown in Fig. 10, to-wit, ports 20 and 20ª connected together and communicating with a lateral port 21 leading to the atmosphere and forming the exhaust from the valve; a port 22 communicating directly with the central passage 23 which communicates with the service brake cylinder; a port 24 communicating with a lateral port 25 leading to a supplementary reservoir; a port 26 communicating with a lateral port 27 leading to the usual reducing valve; a port 28 communicating with the longitudinal passage 29 which opens into the brake cylinder connection 23; a port 30 communicating with the vertical passage 31 which communicates with the train pipe passage 12, but in which connection there is a check valve 32 normally held seated against train pipe pressure by spring 33; a small port 34 communicating with passage 35 leading to the train pipe passage 12; two small vertical ports 36 and 37 which are connected by the horizontal passage 38; and a port 39 communicating with lateral port 39ª leading to the emergency brake cylinder.

Coöperating with the valve seat are two slide valves, to-wit, a relatively small slide valve 40 and a larger slide valve 41. The slide valve 40 is held between an end projection 42 and a central projection 43 on the stem 6 of the main piston, so that said valve 40 at all times moves with the piston 5. The larger slide valve 41 is held between the central projection 43 and a shoulder 44 on the main piston stem, but does not fill the space between said projections so that there is a certain amount of lost motion which permits the main piston to move at times without moving the valve 41.

The smaller slide valve 40 in plan view is of the form shown in Figs. 3 to 9, the same not being of rectangular form, but being cut away on one end for substantially half of its width, as at 46, and on the diagonally opposite corner being cut away for substantially half of its width and length, as at 47. Said valve in its lower surface is provided with a substantially square cavity 45 located on the longer side of said valve and with another cavity 48 extending for a considerable distance widthwise but only a short distance lengthwise of said valve, said cavity near one end having a longitudinal extension 49.

The slide valve 41 is of substantially rectangular form, having its forward lower edge cut away, as at 50. It is provided in its lower face with a pair of cavities, to-wit, a large substantially square cavity 52, and near one side edge with a smaller narrow cavity 53 extending longitudinally of said valve. The slide valves are held to the seat by the usual springs 55.

The valve has seven positions, as follows:

1. *Full release and re-charging position.* (Shown in Figs. 1, 3, 11, 12, 14, 15, 16 and 17.)—In this position the main piston is at its extreme forward stroke so as to uncover the feeding groove 15. Train pipe air entering the valve through passage 11, passes by way of passages 12 and 13 and port 14 to piston chamber 4, thence through feed groove 15 to the longitudinal bore 7 of the valve and thence to the auxiliary reservoir until the pressure therein equalizes with train pipe pressure. In this position the port 24 in the valve seat is uncovered so that air also passes to the supplementary reservoir by way of transverse passage 25, charging said supplementary reservoir to the same pressure as the auxiliary reservoir. The port 30 in the valve seat is uncovered by the large slide valve 41, which allows train pipe pressure to escape past the check valve 32 and enter the triple valve bore 7 and go thence to the auxiliary and supplementary reservoirs. The check valve 32 will remain open until the pressure in the auxiliary and supplementary reservoirs plus the tension of spring 33 equalizes with the train pipe pressure, when said check valve closes, and the further charging of the auxiliary and supplementary reservoirs is completed more slowly through the feed groove 15. The port 30 provides for quickly charging the reservoirs on the car, as will be understood. In this position the service brake cylinder port 22 is connected with the exhaust port 20 through the transverse cavity 48 in slide valve 40, and the emergency brake cylinder port 39 is connected to the exhaust port 20ª through the cavity 45 in slide valve 40, thereby venting both the service and emergency brake cylinders to the atmosphere and releasing the brakes. All other ports in the valve seat are blanked in this position of the valve.

2. *Quick service or serial venting position.* (Shown in Fig. 4.)—This position is assumed upon the first movement of the main piston, and results in moving the small slide valve 40 from the position shown in Fig. 3 to that shown in Fig. 4, but without moving the large slide valve 41, due to the lost motion connection between the main piston stem and said valve 41. In this position all of the ports and passages remain as before, except that the feed groove 15 and exhaust ports 20 and 20ª are closed. Supplementary reservoir port 24 is also closed, thereby trapping the air in said reservoir, and a direct connection is made between the train pipe and the service brake cylinder through the port 34, cavity 53 in the slide valve 41, port 36, passage 38 and port 37 in the valve seat, cavity 48 and extension 49 thereof in the slide valve 40 to the service brake cylinder port 22. The result is that the train pipe is momentarily vented into the service brake cylinder, which is at atmospheric pressure, thereby producing a drop in pressure in the train pipe at the car and securing a quicker serial action of the brakes throughout the length of the train. The effect is the same as though at each car the train pipe were momentarily vented to the atmosphere, to secure quicker reduction of train pipe pressure toward the rear end of the train than would be possible if all of the air had to flow forwardly and out at the engineer's brake valve. Instead, however, of venting the train pipe at each car to the atmosphere it is vented into the empty service brake cylinder, thereby producing a light setting of the brakes. The emergency brake cylinder port 39, however, is blanked. The valve remains for a brief time in this position due to the fact that the first movement of the piston 5 moves only the small slide valve 40, but as soon as the slack between the piston stem 6 and larger slide valve 41 is taken up, the greater frictional resistance encountered momentarily checks the movement of the piston, thereby providing an appreciable time of venting the train pipe into the empty brake cylinder. The reduction of train pipe pressure caused thereby, however, produces a sufficient overbalancing of pressure on the opposite sides of the main piston to overcome the friction of both slide valves, and the valve almost immediately moves over to the next position now to be described.

3. *Full service position.* (Shown in Fig. 5.)—In this position the small slide valve 40 has moved over sufficiently so that its cutaway portion 47 uncovers the service brake cylinder port 22, allowing auxiliary reservoir air to rush into said brake cylinder, the exhaust port 20 remaining blanked, as in the previous position. The ports 34, 36 and 37 are likewise blanked, as is also the supplementary reservoir port 24 which, while it communicates with the cavity 48, is nevertheless blanked because said cavity does not extend through the slide valve. The emergency brake cylinder port 39 is, however, blanked, so that in this position only the service brake cylinder is supplied with air. The large slide valve 41 has been moved over so that its cavity 52 connects the brake cylinder port 28 with the reducing valve port 26, permitting all pressure in the brake cylinder in excess of that to which the reducing valve has been set to escape to prevent flattening the wheels.

4. *Service lap position.* (Shown in Fig. 6.)—This position is assumed by the valve on a slight recoil, such as occurs immediately after a service application, due to a momentary overbalancing of pressure on the train pipe side of the main piston. The large slide valve 41 remains stationary, due to the lost motion connection between itself and the piston stem, but the small slide valve 40 is moved over sufficiently to blank the service brake cylinder port 22, thereby cutting off further flow of air from the auxiliary reservoir to said brake cylinder. All other ports remain blank.

5. *Graduated release position.* (Shown in Fig. 7.)—This position is assumed by the valve upon a slight increase of train pipe pressure after a service application, to move the valves partly over toward release position and slowly release the brakes. In this position the large slide valve 41 blanks the connection between the brake cylinder port 28 and the reducing valve port 26. The supplementary reservoir port 24 is also partly uncovered by slide valve 40 so that said reservoir replenishes the auxiliary reservoir to the degree of equalization with the increased train pipe pressure. The important change in position, however, is that the cavity 48 in slide valve 40 partly uncovers brake cylinder port 22 and exhaust port 20, thereby permitting the brake cylinder to slowly vent to the atmosphere. This position of the valve remains only momentarily, as the slight recoil which always occurs after movement of the valve, moves the same back to blank the connection between the brake cylinder port 22 and exhaust port 20, but by again slightly increasing the train pipe pressure the valve can be repeatedly moved to the position shown in Fig. 7 and the brakes graduated off. The cavity 45 partly uncovers emergency cylinder port 39, but no effect is produced thereby since it also partly uncovers exhaust port 20, and fully uncovers exhaust port 20$^a$.

6. *Graduated release lap position.* (Shown in Fig. 8.)—This position is due to the slight recoil above referred to, or by the slight increase of auxiliary reservoir pressure over train pipe pressure, due to the high pressure from the supplementary reservoir flowing into the auxiliary reservoir by way of port 24 when the valve is in graduated release position, shown in Fig. 7. The large slide valve 41 has remained stationary, but the small slide valve 40 has been moved sufficiently to blank the connection between the brake cylinder port 22 and the exhaust port 20, and also to blank the supplementary reservoir port 24 and the emergency brake cylinder port 39.

7. *Emergency position.* (Shown in Figs. 2 and 9.)—This position is assumed by the valve upon a large reduction in train pipe pressure, which causes the main piston 5 to compress the graduating spring 9 and move fully over to its left hand position, thereby dragging with it both slide valves. In this position the exhaust ports 20 and 20$^a$ are blanked, as is also port 26 leading to the retaining valve. Both the service brake cylinder port 22 and the emergency brake cylinder port 39, as well as the supplementary reservoir port 24 are fully uncovered, and consequently both brake cylinders are supplied with air from both the auxiliary and the supplementary reservoirs. The large slide valve 41 has also been moved over until its cavity 52 connects the brake cylinder port 28 with the train pipe port 30, so that train pipe pressure can pass the check valve 32 and rush to the service brake cylinder. Inasmuch as the service brake cylinder port 22 is in direct connection with the emergency brake cylinder port 39, the emergency brake cylinder also receives some of the train pipe air. This flow of train pipe air continues until the brake cylinder pressure plus the tension of spring 33 overbalances the train pipe pressure. Consequently, in emergency application both brake cylinders are supplied with air from the train pipe during the early part of the application, thereby securing a quick serial action of the brakes throughout the train by reduction of train pipe pressure at each car, but as soon as brake cylinder pressure overcomes train pipe pressure the check valve 32 closes, and thereafter the application is completed by the equalization of the auxiliary and supplementary reservoir pressures with the service and emergency brake cylinders. The emergency position of the valve can be secured either directly from the full release position, or from any of the other positions of the valve, by merely reducing the train pipe pressure below the point of equalization of auxiliary reservoir pressure with the brake cylinders.

The valve described, therefore, has all of the usual functions of triple valves, including a quick service or serial venting position to secure the rapid serial action of the brakes throughout the train, and also a graduated releasing of the brakes, in addition to the usual service application and a special emergency application, as well as enabling the brakes to be held in any of the positions by lapping the valve. The valve, therefore, performs all of the functions of the most approved triple valves, but by a mechanical construction which is very much simpler and less complicated than existing valves which perform all of the functions of this valve, so that the valve not only is cheaper in first cost, but is more reliable in action, less liable to get out of repair, cheaper in its up keep, and offers very much less resistance to movement than similar valves for securing the same functional effects.

What I claim is:—

1. A triple valve having connections to the train pipe, auxiliary reservoir and two brake cylinders, and ports and valve mechanism arranged on light reduction in the train pipe pressure to open communication directly from the train pipe to one of said brake cylinders, and on emergency reduction in train pipe pressure to open communication from the auxiliary reservoir to both brake cylinders.

2. A triple valve having connections to the train pipe, auxiliary reservoir and two brake cylinders, and ports and valve mechanism arranged on a service reduction in train pipe pressure to first open communication from the train pipe to one of said brake cylinders and then break said communication and open communication from the auxiliary reservoir to the brake cylinder, and on emergency reduction in train pipe pressure to open communication from the auxiliary reservoir to both brake cylinders.

3. A triple valve having connections to the train pipe, auxiliary reservoir and two brake cylinders, said triple valve including a movable abutment actuated by variations in train pipe pressure, a pair of valves actuated by said movable abutment and movable relative to each other, and ports controlled by said valves and arranged on light reduction in train pipe pressure to open communication directly from the train pipe to one of said brake cylinders, and on emergency reduction in train pipe pressure to open communication from the auxiliary reservoir to both brake cylinders.

4. A triple valve having connections to the train pipe, auxiliary reservoir and two brake cylinders, said triple valve including a movable abutment actuated by variations in train pipe pressure, a pair of valves actuated by said movable abutment and movable relative to each other, and ports controlled by said valves and arranged on service reduction in the train pipe pressure to first open communication from the train pipe to one of said brake cylinders and then break said communication and open communication from the auxiliary reservoir to the brake cylinder, and on emergency reduction in train pipe pressure to open communication from the auxiliary reservoir to both brake cylinders.

5. A triple valve comprising a casing having connections to the train pipe and auxiliary reservoir, a seat in said casing provided with ports communicating with two separate brake cylinders and with a supplementary reservoir, and a valve device coöperating with said seat and arranged on a large reduction of train pipe pressure to open up communication from both the auxiliary and the supplementary reservoirs to both brake cylinders.

6. A triple valve comprising a casing having connections to the train pipe and auxiliary reservoir, a seat in said casing provided with ports communicating with two separate brake cylinders, the train pipe and a supplementary reservoir, and a valve device coöperating with said seat and arranged on large reduction of train pipe pressure to open communication from the train pipe to one of said brake cylinders and also from the auxiliary and supplementary reservoirs to both brake cylinders.

7. A triple valve comprising a casing having connections to the train pipe and auxiliary reservoir, a seat in said casing provided with ports communicating with two separate brake cylinders, the train pipe and a supplementary reservoir, and a valve device coöperating with said seat and arranged on large reduction of train pipe pressure to open communication from the train pipe to one of said brake cylinders and also from the auxiliary and supplementary reservoirs to both brake cylinders, and a check valve in the connection between the train pipe and the brake cylinder and seating toward the train pipe.

8. A triple valve comprising a casing having connections to the train pipe and auxiliary reservoir, a seat in said casing provided with ports communicating with two separate brake cylinders and with a supplementary reservoir, a movable abutment actuated by variations in train pipe pressure, and a pair of valves actuated thereby and having movement relative one to the other and arranged on a large reduction of train pipe pressure to open communication from the auxiliary and supplementary reservoirs to both brake cylinders.

9. A triple valve comprising a casing having connections to the train pipe and auxiliary reservoir, a seat in said casing having ports connecting with the train pipe, a supplementary reservoir, and with two separate brake cylinders, a movable abutment actuated by variations in train pipe pressure, and a pair of valves actuated thereby and having relative movement one to the other and arranged on large reduction of train pipe pressure to open communication from the train pipe port to one of said brake cylinder ports and also from the auxiliary and supplementary reservoirs to both brake cylinder ports.

10. A triple valve comprising a casing having connections to the train pipe and auxiliary reservoir, a seat in said casing having ports connecting with the train pipe, a supplementary reservoir, and with two separate brake cylinders, a movable abutment actuated by variations in train pipe pressure, a pair of valves actuated thereby and having relative movement one to the other and arranged on large reduction of train pipe pressure to open communication from the train pipe port to one of said brake cylinder ports and also from the auxiliary and supplementary reservoirs to both brake cylinder ports, and a check valve in the connection between the train pipe to the brake cylinder and seating toward the train pipe.

11. A triple valve having connections to the atmosphere, train pipe, two brake cylinders, auxiliary reservoir and a supplementary reservoir, and ports and valve mechanism arranged on a slight increase of train pipe pressure after a service application to open a small communication from the service brake cylinder to the atmosphere and simultaneously open communication from the supplementary reservoir to the auxiliary reservoir and thereby bring the valve mechanism to lap position, and on emergency reduction in train pipe pressure to open communication from both the auxiliary and supplementary reservoirs to both brake cylinders.

12. A triple valve having connections to the atmosphere, train pipe, two brake cylinders and auxiliary reservoir, a movable abutment actuated by variations in train pipe pressure, a pair of valves actuated thereby and having movement relative to one another, and ports controlled by said valves and arranged on a slight increase of train pipe pressure after service application to open a small connection from the service brake cylinder to the atmosphere, and on emergency reduction in train pipe pressure to open communication from the auxiliary reservoir to both brake cylinders.

13. A triple valve having connections to the atmosphere, train pipe, two brake cylinders, auxiliary reservoir and a supplementary reservoir, a movable abutment actuated by variations in train pipe pressure, a pair of valves actuated thereby and having movement relative to one another, and ports controlled by said valves and arranged on a slight increase of train pipe pressure after service application to open a small connection from the service brake cylinder to the atmosphere and simultaneously open a connection from the supplementary reservoir to the auxiliary reservoir and thereby bring the valves to lap position, and on emergency reduction in train pipe pressure to open commmunication from both the auxiliary and supplementary reservoirs to both brake cylinders.

14. A triple valve having connections to the atmosphere, train pipe, two brake cylinders and auxiliary reservoir, and ports and valve mechanism arranged on a large increase of train pipe pressure to connect both brake cylinders to the atmosphere and the train pipe directly to the auxiliary reservoir through a check valve, and on emergency reduction in train pipe pressure to open communication from the auxiliary reservoir to both brake cylinders.

15. A triple valve having connections to the atmosphere, train pipe, two brake cylinders and auxiliary reservoir, a movable abutment actuated by variations in train pipe pressure, a pair of valves actuated thereby, and having movement relative to one another, and ports controlled by said valves and arranged on a large increase of pressure in the train pipe to connect both brake cylinders to the atmosphere and the train pipe to the auxiliary reservoir through a check valve, and on emergency reduction in train pipe pressure to open communication from the auxiliary reservoir to both brake cylinders.

16. A triple valve having connections to the atmosphere, train pipe, two brake cylinders, auxiliary reservoir and a supplementary reservoir, a movable abutment actuated by variations in train pipe pressure, a valve seat provided with a pair of ports, one leading directly to one of said brake cylinders and the other leading directly to the other brake cylinder, and a single valve actuated by said movable abutment and controlling both of said ports and arranged upon moderate reduction in train pipe pressure to connect the auxiliary reservoir to one of said brake cylinders and trap the air in the supplementary reservoir, and upon emergency reduction of train pipe pressure to connect both the supplementary and the auxiliary reservoirs directly to both brake cylinders.

17. A triple valve having connections to the atmosphere, train pipe, two brake cylinders, auxiliary reservoir and a supplementary reservoir, and ports and valve mechanism arranged on large excess of train pipe pressure over auxiliary reservoir pressure to charge both the auxiliary and the supplementary reservoirs, upon moderate reduction of train pipe pressure to connect the auxiliary reservoir with one of said brake cylinders and close the connection from the supplementary reservoir, upon slight excess of train pipe pressure over auxiliary reservoir pressure to open a small communication from said brake cylinder to the atmosphere and simultaneously open a communication from the supplementary reservoir to the auxiliary reservoir, and upon large reduction of train pipe pressure to connect both the supplementary reservoir and the auxiliary reservoir to both brake cylinders.

18. A triple valve having connections to the atmosphere, train pipe, two brake cylinders, auxiliary reservoir and a supplementary reservoir, a movable abutment actuated by variations in train pipe pressure, a pair of slide valves actuated thereby and having movement relative to one another, and ports controlled by said valves and arranged on an excess of train pipe pressure over auxiliary reservoir pressure to charge both reservoirs and exhaust both brake cylinders, upon moderate reduction of train pipe pressure to connect the auxiliary reservoir with one of said brake cylinders and trap the air in the supplementary reservoir, and upon emergency reduction of train pipe pressure to connect both the supplementary and the auxiliary reservoirs to both brake cylinders.

19. A triple valve having connections to the atmosphere, train pipe, two brake cylinders, auxiliary reservoir and a supplementary reservoir, a movable abutment actuated by variations in train pipe pressure, a pair of valves actuated thereby and having movement relative to one another, and ports controlled by said valves and arranged on a large excess of train pipe pressure over auxiliary reservoir pressure to charge both the auxiliary and the supplementary reservoirs, upon moderate reduction of train pipe pressure to connect the auxiliary reservoir with one of said brake cylinders and close the connection from the supplementary reservoir, upon slight excess of train pipe pressure over auxiliary reservoir pressure to open a small communication from said brake cylinder to the atmosphere and simultaneously open a communication from the supplementary reservoir to the auxiliary reservoir, and upon large reduction of train pipe pressure to connect both the supplementary reservoir and the auxiliary reservoir to both brake cylinders.

20. A triple valve having connections to the atmosphere, train pipe, two brake cylinders, auxiliary reservoir and a supplementary reservoir, and ports and valve mechanism arranged on an excess of train pipe pressure over auxiliary reservoir pressure to exhaust the brake cylinder and open a direct charging connection from the train pipe to both reservoirs past a check valve in said connection, upon moderate reduction of train pipe pressure to connect the auxiliary reservoir with the brake cylinder and trap the air in the supplementary reservoir, and upon emergency reduction of train pipe pressure to connect both the supplementary and auxiliary reservoirs to both brake cylinders.

21. A triple valve having connections to the atmosphere, train pipe, two brake cylinders, auxiliary reservoir and a supplementary reservoir, and ports and valve mechanism arranged on a large excess of train pipe pressure over auxiliary reservoir pressure to charge both the auxiliary and the supplementary reservoirs, upon moderate reduction of train pipe pressure to connect the auxiliary reservoir with one of said brake cylinders and close the connection from the supplementary reservoir, upon slight excess of train pipe pressure over auxiliary reservoir pressure to open a small communication from said brake cylinder to the atmosphere and simultaneously open a communication from the supplementary reservoir to the auxiliary reservoir, and upon large reduction of train pipe pressure to connect the train pipe to both brake cylinders and also connect both the supplementary reservoir and the auxiliary reservoir to both brake cylinders.

22. A triple valve having connections to the atmosphere, train pipe, two brake cylinders, auxiliary reservoir and a supplementary reservoir, and ports and valve mechanism arranged on a large excess of train pipe pressure over auxiliary reservoir pressure to open a connection past a check valve directly from the train pipe to the auxiliary and supplementary reservoirs, upon moderate reduction of train pipe pressure to connect the auxiliary reservoir with one of said brake cylinders and close the connection from the supplementary reservoir, upon slight excess of train pipe pressure over auxiliary reservoir pressure to open a small communication from said brake cylinder to the atmosphere and simultaneously open a communication from the supplementary reservoir to the auxiliary reservoir, and upon large reduction of train pipe pressure to connect the train pipe past a check valve directly with both brake cylinders and also connect both the supplementary and auxiliary reservoirs to both brake cylinders.

23. A triple valve having connections to the atmosphere, train pipe, two brake cylinders, auxiliary reservoir and a supplementary reservoir, a movable abutment actuated by variations in train pipe pressure, a seat provided with a port communicating with the supplementary reservoir connection, and a valve actuated by said movable abutment and controlling said supplementary reservoir port and arranged upon moderate reduction in train pipe pressure to connect the auxiliary reservoir with one of the brake cylinders and close the supplementary reservoir port and upon emergency reduction of train pipe pressure to open the supplementary reservoir port and connect the same with one of the brake cylinders.

24. A triple valve having connections to the atmosphere, train pipe, two brake cylinders, auxiliary reservoir and a supplementary reservoir, a movable abutment actuated by variations in train pipe pressure, a valve seat provided with a port communicating with the supplementary reservoir connection and with two ports, one communicating with each of the brake cylinders, and a valve actuated by said movable abutment and directly controlling all of said ports and arranged upon moderate reduction in train pipe pressure to open one of said brake cylinder ports and close the supplementary reservoir port and upon emergency reduction of train pipe pressure to open all three ports.

In testimony whereof, I have hereunto set my hand.

JACOB RUSH SNYDER.

Witnesses:
F. W. WINTER,
MARY E. CAHOON.

Copies of this patent may be obtained for five cents each, by addressing the "Commissioner of Patents, Washington, D. C."